UNITED STATES PATENT OFFICE.

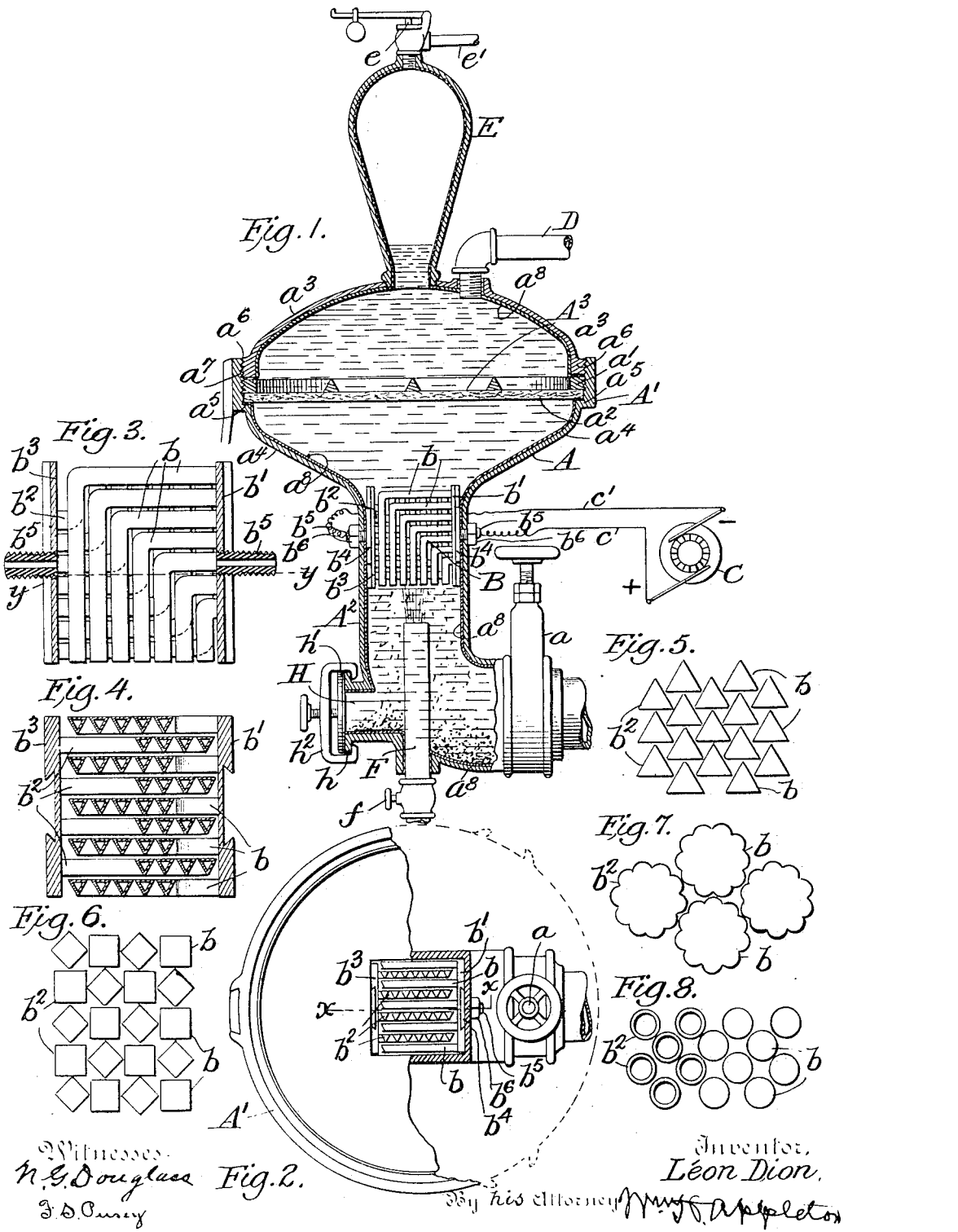

LÉON DION, OF NEW YORK, N. Y., ASSIGNOR TO THE AMERICUS ELECTRO-HERMATIC COMPANY, OF NEW YORK, N. Y., A CORPORATION OF ARIZONA TERRITORY.

APPARATUS FOR TREATING LIQUIDS.

No. 819,209.     Specification of Letters Patent.     Patented May 1, 1906.

Application filed June 3, 1904. Serial No. 210,979.

*To all whom it may concern:*

Be it known that I, LÉON DION, a citizen of the United States, and a resident of the borough of Manhattan, in the city, county, and State of New York, have invented certain new and useful improvements in apparatus for treating liquids whereby to recover the metals and other substances contained in them and to purify such liquids, of which the following is a specification.

In an application for Letters Patent filed by me in the United States Patent Office on May 24, 1904, and serially numbered 209,557, I have shown and described an apparatus of this general class in which the liquid to be treated enters the apparatus at the top of an upwardly-extending chamber portion of the vessel or reservoir, and after passing downward between a group of plate-like positive and negative electrically-charged electrodes and becoming charged thereby with electricity the particles of metal and the other substances contained in it are separated out as a consequence from the liquid, after which they pass downwardly by the action of gravity between a second group of similarly-constructed electrodes, where they are subjected to the action of a second electric current and are thence deposited by the continued action of gravity in the lower portion of the vessel or reservoir, while the liquid purified by the elimination of these particles passes upward through a suitable filter and thence outward through a suitable pipe to the point of discharge.

My present invention is designed as an improvement upon the apparatus shown and described in the application aforesaid, and has for its object not only an increase in the efficiency of the electrodes, but also a more thorough circulation of the liquid to be treated between and around them.

To these ends the invention consists, first, in the construction of the electrodes; second, in the arrangement of these electrodes with respect to the pipe by means of which the liquid is delivered to them, and, third, in various other constructions and combinations of parts, all as will hereinafter more fully appear.

Referring to the accompanying drawings, which form a part of this specification, Figure 1 is a side elevation, partly in section, of an apparatus constructed in accordance with my invention; Fig. 2, a plan view thereof, partly in section, with the top of the upper enlarged globular portion of the vessel or reservoir removed and portions of the parts below broken away with their outlines shown in dotted lines; Fig. 3, a vertical section of the electrodes and a portion of the vessel or reservoir in which they are contained, taken in the plane $x\ x$ of Fig. 2; Fig. 4, a transverse horizontal section of the same, taken in the plane $y\ y$ of Fig. 3; Fig. 5, a reverse plan view of the form of electrodes shown in Figs. 2, 3, and 4; and Figs. 6, 7, and 8, similar reverse plan views of the lower end of electrodes of slightly-modified forms.

In all the figures like letters of reference are employed to indicate corresponding parts.

A indicates a vessel or reservoir for receiving the liquid to be treated, and B a group of electrodes by means of which the liquid contained within the vessel or reservoir is or may be charged with electricity, and thereby not only the metals and other substances carried by it separated out from the same, but the purification of the liquid effected at the same time.

The vessel or reservoir A is preferably constructed with an enlarged globular upper portion A' and with a contracted lower body portion $A^2$, which in the form of the invention selected for purposes of illustration is curved outward at its lower end to one side and provided with a gate $a$, by means of which the passage-way through this lower portion may be opened and closed, as desired.

The electrodes composing the group B, on the other hand, are preferably constructed in the form of bars or tubes and of any appropriate material that will act upon the metal or other material to be eliminated and cause the latter's separation from the water or other liquid in which it is contained. When employed in connection with water or other liquid in which copper, for instance, is contained in solution, I have found that a positive electrode made of copper and a negative electrode made of carbon have operated advantageously, while with water or liquids containing other substances in solution I have found that a positive electrode made of steel and a negative electrode made of carbon have operated efficiently, and so on, each particular metal or material to be eliminated and recovered requiring its appropriate electrode, as will be readily understood.

With the electrodes constructed as above explained, the rows of the positive series $b$ are secured at one of their ends to the base-plate $b'$, while the rows of the negative series $b^2$ are similarly secured at one of their ends to a corresponding base-plate $b^3$, and, as thus disposed, the series are supported within the lower contracted body portion $A^2$ with the rows of positive electrodes $b$ projecting between and alternating with the rows of the negative electrodes $b^2$, but without being in contact with them or without the rows of either extending sufficiently far across to touch or be in contact with the base-plate of the other. For supporting the electrodes in this relationship various means may be employed. In the drawings, however, I have shown this result accomplished by blocks $b^4$, to which their respective base-plates $b'$ and $b^3$ are dovetailed, supplemented by hollow screw-studs $b^5$, which, secured at their inner ends in the respective base-plates $b'$ and $b^3$, are or may be constructed of non-conducting material and extend outward through suitable orifices formed through the walls of the vessel or reservoir A, where on their outer ends they severally receive coöperating nuts $b^6$. In some instances these electrodes $b$ and $b^2$ may be so constructed that each will lie in the same straight line throughout its entire length. In the drawings, however, I have shown them constructed in right-angular form in the direction of their lengths, and the members of each row arranged the one within the other, with the horizontal and vertical portions of each in parallel relationship to the corresponding portions of the others. To permit of this being accomplished, the horizontal and vertical portions of each electrode, from the outer to the inner one of the row, are made somewhat shorter than the corresponding parts of the preceding electrode, and so on throughout the row, the horizontal and vertical portions of each succeeding electrode toward the innermost one being progressively shorter than those of the preceding one. By this means, as will be seen, not only may the horizontal and vertical portions of the electrodes of each row be brought into parallel relationship and their vertical portion so spaced as to make the row extend at the proper distance apart substantially across from the base-plate $b'$ to the base-plate $b^3$, but the free ends of the vertical portions of the members of each row all terminate in substantially the same plane.

With the electrodes constructed and arranged upon their respective supporting base-plates, as above described, the positive and negative series may be so disposed that the vertical portions of both series may extend either downward or upward from their respective horizontal portions. I prefer, however, to so arrange them that the vertical portions of the positive series $b$ shall extend downward from their respective horizontal portions and the vertical portions of the negative series $b^2$ extend upward from theirs; but any one of these arrangements may be adopted and the apparatus operate with equal efficiency. In some instances these positive and negative electrodes may be constructed of tubes or bars that are rectangular in cross-section and may be arranged either with the adjacent sides of the adjoining rows in parallel relationship or with every alternate tube or bar arranged at an angle to the others, as shown more fully in Fig. 6. In other instances these electrodes may be of the forms in cross-section shown in Figs. 7 and 8, and constructed either as solid rods or bars or as open tubes, as shown in Fig. 8, and when the forms shown in these two figures are employed the positive electrodes will be arranged in such close relationship to the negative electrodes as to project slightly between the adjacent ones without contacting with them. I prefer, however, to construct these electrodes of the cross-section shown in Fig. 3, 4, and 5, which is that of an equilateral triangle, and to either dispose them in the relationship shown in Figs. 1, 3, and 4 or in that shown in Fig. 5, as by this form of electrode greater efficiency is attained.

As thus constructed in any of the forms specified the electrodes of the positive series $b$ are all electrically connected through their supporting base-plate $b'$, while the electrodes of the negative series $b^2$ are all similarly connected through their supporting base-plate $b^3$, with both series respectively connected with the positive and negative poles or elements of a dynamo C or other source of electric supply through the intermediaries of suitable conductors $c$ and $c'$ extending between them.

With the electrodes thus disposed within the contracted body portion of the receptacle or reservoir A, the upper enlarged globular portion A' of the latter is provided with a suitable filter $A^3$. This filter, which may be constructed in any approved form, is here shown as composed of a suitable frame $a'$, with a layer or layers of felt $a^2$ or other appropriate filtering material secured to or supported upon it and is arranged centrally within the upper enlarged globular portion A' of the vessel or reservoir above and in transverse relationship to the electrodes B. To permit of this arrangement being effected, the upper enlarged globular portion A' is constructed with a removable top $a^3$, with the bottom portion $a^4$ counterbored for a small distance, whereby to form a shoulder or ledge $a^5$. Upon the shoulder or ledge thus formed the filter $A^3$ rests and may be firmly clamped by the removable top $a^3$, which is provided around its outer lower edge with a screw-thread $a^6$, that engages with a corresponding female screw-thread $a^7$, formed in the interior of the counterbored upper end of the bottom portion $a^4$. By this means, as will be seen, not only is the filter firmly clamped in place when arranged in operative relationship, but the removal of the same and access to it afforded when desired.

The upper enlarged globular portion $A'$ being thus equipped with the filter $A^3$ it is also provided with a discharge-pipe D, by means of which the liquid passing through the filter may be discharged, and with a chamber E, which in turn is provided in its top with a pressure-valve $e$ and with a discharge-pipe $e'$ leading from it, whereby when the pressure within the vessel or reservoir A exceeds a certain limit the air or other contents of the chamber may pass off through them, and such pressure be thereby relieved.

While the upper enlarged globular portion of the vessel or reservoir A is thus supplied, the lower end of the contracted body portion $A^2$, which extends some distance below the group of electrodes B, is provided with a pipe F, through which the liquid to be treated may be supplied to the apparatus and which extends upwardly through the bottom of this lower portion and is provided with a suitable valve $f$, by means of which the flow of the liquid therethrough may be controlled and regulated. In addition to the pipe F the lower end of this contracted body portion $A^2$ is equipped with a hand-hole H, through which access to its interior may be effected when desired. This hand-hole is preferably constructed in the form of a short pipe and is located in the side of the lower contracted body portion opposite to that toward which that portion of the vessel or reservoir curves and is provided around its outer end with an outwardly-extending flange $h$. As thus constructed this hand-hole may be closed when desired by a suitable plate $h'$, which may be held in place over it by means of a screw-clamp $h^2$, that is arranged over the same and engages at its inturned ends with the flange $h$.

The various parts being constructed and arranged as above explained, the interior of the vessel or reservoir A, as well as the interiors of the chamber E and hand-hole H, will in practice be preferably provided with an insulating-lining $a^8$ throughout, while the pipes D and F and the filter $A^3$ will be similarly insulated from the vessel or reservoir A at the points where they enter or contact with its casing by suitable insulating material interposed between them, as shown.

With an apparatus constructed as above described and with an electric current supplied to the electrodes through a proper circuit the operation of the apparatus is as follows:

The liquid to be treated will be delivered in the lower end of the lower contracted body portion $A^2$, through the pipe F, and passing upward between and around the electrodes will be charged with electricity thereby. As a consequence of this the metal or other substances contained in the liquid will be separated out from it and deposited by the action of gravity on the bottom of the lower contracted portion of the vessel or reservoir A. With the liquid thus freed from the metal or other substances and purified it will rise in the vessel or reservoir A, and passing upward through the filter $A^3$, where it will part with any floating particles held in mechanical suspension therein, will flow onto and through the discharge-pipe D and be discharged. The operation thus initiated will be continued as long as desired and the removal of the metal or other substances in the bottom of the vessel or reservoir A accomplished from time to time through its curved lower end by opening the gate $a$ therein, when it will pass outward through the same into an appropriate receptacle arranged to receive it.

The metal or other substances having been thus removed from the lower end of the lower contracted portion $A'$, the gate $a$ will be closed until the accumulation of metal or other substances in the lower end of the lower contracted portion becomes sufficiently great when the metal or other substances may be again removed, as before explained, and so on indefinitely, the liquid, after having been treated, being discharged in a thoroughly purified and filtered condition.

Should the metal or other substances contained in the lower end of the lower contracted portion of the vessel or reservoir A fail to discharge itself when the gate $a$ therein is opened, it may be forced outward therethrough by the hand of the operator or by some implement thrust inward through the hand-hole H, which may be permitted, when it is desired, by simply removing the plate $h'$.

While in the drawings I have shown the requisite current supplied from an ordinary dynamo, I wish it distinctly understood that I do not limit myself thereto, as it is obvious that I may employ any other form of generator and may avail of either friction, voltaic, or other form of current, as may be preferred or found the most convenient.

From the foregoing it will be seen that I produce an apparatus for treating liquids to recover the metals or other substances contained in them and purifying the liquid which is exceedingly simple in construction and which, by reason of the prismoidal form of the electrodes employed, permits of the more thorough circulation of the liquid between and in contact with them with a higher degree of electrification than is possible with the forms of electrodes heretofore in use.

Having now described my invention and specified certain of the ways in which it is or may be carried into effect, I claim and desire to secure by Letters Patent of the United States—

1. The combination, with a vessel or reservoir, and means through which a liquid may be supplied to it, of a group of coöperating positive and negative electrodes, with which the liquid contained within the vessel or reservoir may be brought in contact, constructed in prismoidal form angularly bent transversely of their axes, and means through which a current of electricity may be supplied to such electrodes, substantially as described.

2. The combination, with a vessel or reservoir constructed with an enlarged globular upper portion and a contracted lower portion, of a group of coöperating positive and negative electrodes arranged within the lower contracted portion of the vessel or reservoir, and constructed in prismoidal form angularly bent transversely of their axes, means through which a current of electricity may be supplied to such electrodes, and means through which a liquid may be supplied to the vessel or reservoir up through the bottom thereof and between the electrodes, substantially as described.

3. The combination, with a base-plate, of a series of electrodes connected at one of their ends thereto in vertical rows, and constructed in prismoidal form bent at points intermediate their lengths whereby each is provided with a horizontal and vertical portion, substantially as described.

4. The combination, with a base-plate, of a series of electrodes connected at one of their ends to such plate, and each constructed of a right-angular form in longitudinal section and of an equilateral triangular form in cross-section, substantially as described.

In witness whereof I have hereunto set my hand this 29th day of January, 1904.

LÉON DION.

Witnesses:
N. G. DOUGLASS,
R. F. SWEENY.